US012039991B1

(12) United States Patent
Kothapally et al.

(10) Patent No.: US 12,039,991 B1
(45) Date of Patent: Jul. 16, 2024

(54) DISTRIBUTED SPEECH ENHANCEMENT USING GENERALIZED EIGENVALUE DECOMPOSITION

(71) Applicant: META PLATFORMS TECHNOLOGIES, LLC, Menlo Park, CA (US)

(72) Inventors: Vinay Kumar Kothapally, Dallas, TX (US); Jacob Ryan Donley, Kirkland, WA (US); Buye Xu, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 297 days.

(21) Appl. No.: 17/532,720

(22) Filed: Nov. 22, 2021

Related U.S. Application Data

(60) Provisional application No. 63/167,748, filed on Mar. 30, 2021.

(51) Int. Cl.

| | |
|---|---|
| ***G10L 21/0232*** | (2013.01) |
| ***G10L 21/0216*** | (2013.01) |
| ***G10L 25/51*** | (2013.01) |
| ***H04R 1/40*** | (2006.01) |
| ***H04R 3/00*** | (2006.01) |

(52) U.S. Cl.
CPC .......... *G10L 21/0232* (2013.01); *G10L 25/51* (2013.01); *H04R 1/406* (2013.01); *H04R 3/005* (2013.01); *G10L 2021/02166* (2013.01)

(58) Field of Classification Search
CPC ................. G10L 21/0232; G10L 25/51; G10L 2021/02166; H04R 1/406; H04R 3/005; H04S 7/302; H04S 7/303; H04S 7/304; H04S 2420/01
See application file for complete search history.

(56) References Cited

U.S. PATENT DOCUMENTS

| | | | | |
|---|---|---|---|---|
| 2012/0328107 A1* | 12/2012 | Nystrom | ................. | H04S 7/303 381/17 |
| 2016/0142851 A1* | 5/2016 | Sun | ........................... | H04S 3/02 381/20 |
| 2019/0172450 A1* | 6/2019 | Mustiere | ................. | G10L 15/20 |
| 2020/0037097 A1* | 1/2020 | Torres | ..................... | H04S 7/303 |
| 2021/0034725 A1* | 2/2021 | Donley | .................. | H04R 1/406 |

* cited by examiner

*Primary Examiner* — Yogeshkumar Patel
(74) *Attorney, Agent, or Firm* — Weaver Austin Villeneuve & Sampson LLP

(57) ABSTRACT

An artificial reality headset enhances audio signals from a target sound source using information from other devices in the local area. A primary headset broadcasts a location of a target sound source to secondary headsets in a local area. The secondary headsets transmit audio signals to the primary headset to enhance the audio content presented by the primary headset to a user. The secondary headset may select an array transfer function for the location of the target sound source. The secondary headsets correlate known transfer functions in the target direction with estimated transfer functions. The secondary headset may perform beamforming on the target sound source and transmit the output audio signal to the primary headset. In some embodiments, the secondary headset may transmit the array transfer function and a raw audio signal to the primary headset. The primary headset generates audio content based on the received audio signal.

20 Claims, 6 Drawing Sheets

DISTRIBUTED SPEECH ENHANCEMENT USING GENERALIZED EIGENVALUE DECOMPOSITION

CROSS-REFERENCE TO RELATED APPLICATIONS

This application claims the benefit of U.S. Provisional Application No. 63/167,748, filed Mar. 30, 2021, which is incorporated by reference in its entirety.

FIELD OF THE INVENTION

This disclosure relates generally to augmented reality systems, and more specifically to distributed speech enhancement using generalized eigenvalue decomposition.

BACKGROUND

Devices that contain microphone arrays, such as artificial reality headsets, process audio signals to enhance sound presented to a user. For example, in a noisy environment such as a crowded restaurant, devices may isolate the voice of a person speaking from background interference noise. However, it may be difficult for a device to isolate the desired sound source from multiple noise sources, particularly in cases where the desired sound source is located far from the device.

SUMMARY

An artificial reality headset enhances audio signals from a target sound source using information from other devices in the local area. A primary headset broadcasts a location of a target sound source to secondary headsets in a local area. The secondary headsets transmit audio signals to the primary headset to enhance the audio content presented by the primary headset to a user. In some embodiments, the secondary headsets may each perform a generalized eigenvalue decomposition to generate a list of array transfer functions for sound sources detected by the secondary headset. The secondary headset may compare the array transfer functions for each sound source to a stored array transfer function for the direction of the broadcast location and selects the array transfer function from the list that most closely correlates to the array transfer function for the broadcast location. The secondary headset may perform beamforming on the target sound source and transmits the output audio signal to the primary headset. In some embodiments, the secondary headset may provide parameters, such as array transfer functions, to the primary headset to assist the primary headset in forming a beam on the target sound source to generate the audio signal. The primary headset generates audio content for a user based on the received audio signal.

In some embodiments, a method may comprise receiving, at a first device, an acoustic signal from a target sound source. The first device may determine a location of the target sound source. The first device may transmit the location of the target sound source to a second device. The second device may select an array transfer function for the target sound source based on the location of the target sound source received from the first device. The second device may generate a first audio signal for the target sound source based on the array transfer function. The first device may receive, from the second device, the first audio signal for the target sound source. The first device may present, based on the first audio signal, audio content for the target sound source. The method may be performed by a processor executing stored instructions on a non-transitory computer-readable storage medium.

In some embodiments, a method may comprise receiving, at a first device, a location of a target sound source from a second device. The first device may retrieve, from a stored set of array transfer functions, an estimated array transfer function for the location of the target sound source. The first device may perform a generalized eigenvalue decomposition (GEVD) for sound sources in a local area, wherein the GEVD generates a list of array transfer functions for the sound sources in the local area. In some embodiments, the first device may perform an Eigenvalue Decomposition (EVD). The first device may select, based on the estimated array transfer function, an array transfer function for the target sound source from the list of array transfer functions. The first device may generate, based on the selected array transfer function, an audio signal for the target sound source. The first device may transmit the audio signal to the second device.

In some embodiments, a non-transitory computer-readable storage medium may have instructions encoded thereon that, when executed by a processor, cause the processor to perform operations comprising receiving, by a processor of a first device, an acoustic signal from a target sound source. The processor may determine a location of the target sound source. The processor may transmit the location of the target sound source to a second device. The second device may select an array transfer function for the target sound source based on the location of the target sound source received from the first device. The second device may generate a first audio signal for the target sound source based on the array transfer function. The processor may receive, from the second device, the first audio signal for the target sound source. The processor may present, based on the first audio signal, audio content for the target sound source.

Figure 1A:
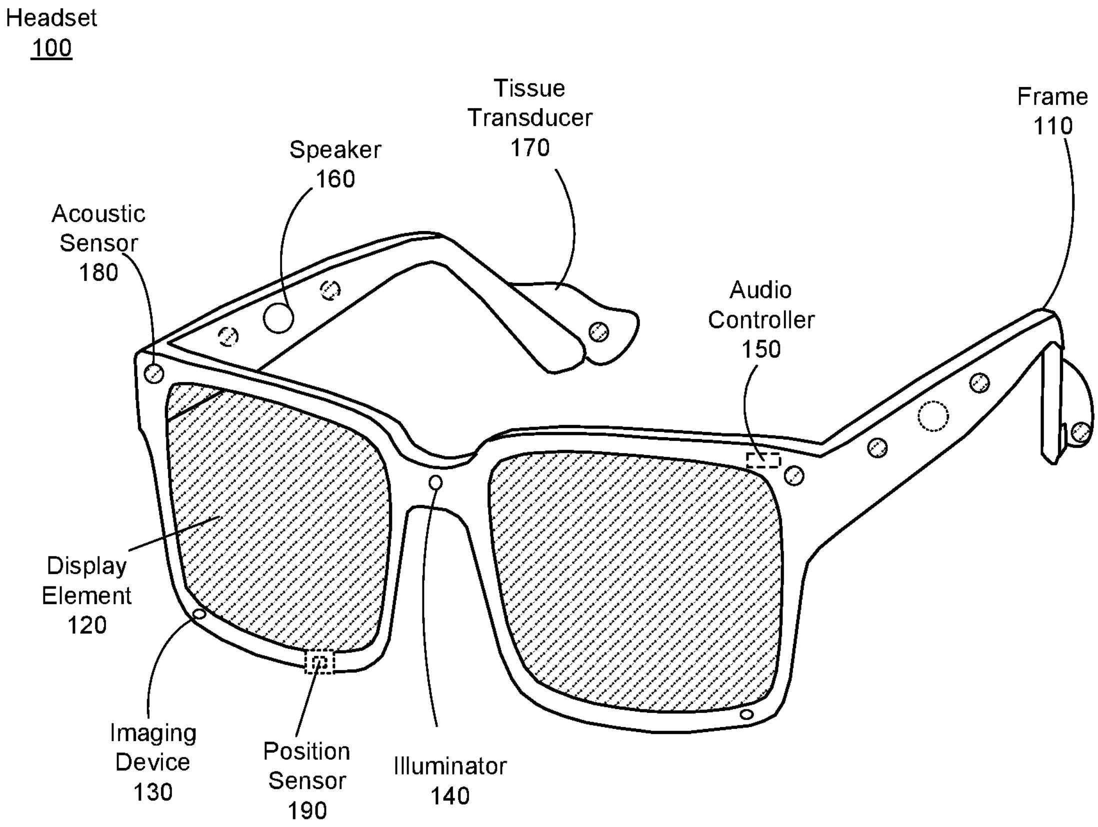
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A headset includes an audio system that enhances audio signals from a target sound source using information from other devices in the local area. A primary headset transmits a location of a target sound source to secondary headsets, and the secondary headsets provide audio signals to the primary headset to enhance audio content output to the user of the primary headset. A headset may function as a primary headset or a secondary headset, depending on whether the headset is attempting to enhance audio content to output to the user of the headset or to transmit audio signals to a different headset for that headset to enhance audio content. In some embodiments, a headset may alternate or simultaneously function as both a primary headset and a secondary headset for different sound sources in the local area. A primary headset broadcasts a location of a target sound source to secondary headsets in a local area. The secondary headsets may each perform a generalized eigenvalue decomposition to generate a list of array transfer functions for sound sources detected by the secondary headset. The secondary headset may compare the array transfer functions for each sound source to a stored array transfer function for the direction of the broadcast location and select the array transfer function from the list that most closely correlates to the array transfer function for the broadcast location. The secondary headset may perform minimum-variance distortionless-response (MVDR) beamformer enhancement on the target sound source and transmit the output audio signal to the primary headset. In some embodiments, the secondary headset may perform linearly-constrained minimum-variance (LCMV) beamformer enhancement, maximum directivity beamformer enhancement, or any other suitable beamformer enhancement. In some embodiments, audio signals transmitted by the secondary headset to the primary headset may comprise an unenhanced audio signal, an enhanced audio signal, array transfer functions for a sound source, an audio signal for a noise source, a single channel noise estimate, multichannel array signals, spatial information such as an estimate of a sound field, the same signal that the secondary headset is presenting to a wearer of the secondary headset, or some combination thereof. The primary headset may process the received audio signals to enhance the audio content presented to the user. In some embodiments, the primary headset may use array transfer functions received from the secondary device to understand spatial characteristics of the target sound source as determined by the secondary headset, such as reflections and possible noise source responses. In some embodiments, the primary headset and the secondary headset may share information describing the available processing resources on each headset, and the headsets may process more or less data on the primary or secondary headset depending on the available processing resources.

The primary headset performs MVDR beamformer enhancement, LCMV beamformer enhancement, maximum directivity beamformer enhancement, generalized sidelobe canceller beamformer enhancement, some other beamformer enhancement, or some combination thereof, on the target sound source. The primary headset may compare the signal-to-noise ratio (SNR) in the locally enhanced audio signal to the SNR in the audio signal received from the secondary headset. The primary headset may select the audio signal with the highest SNR and output the audio content to a user of the primary headset. In some embodiments, the primary headset may combine the locally enhanced audio signal and the received audio signal to further enhance the audio signal.

Multiple devices in a local area may share information to enhance sound presented to a user. For example, a first device may transmit an audio signal from a target sound source to a second device for presentation to a user of the second device. Transmitting multiple audio signals between headsets may require significant bandwidth and involve latency that causes a delay in the ability to produce enhanced signals for a user of a headset. Some methods involve each secondary headset forming a beam in the direction of the dominant sound source relative to the secondary headset (i.e., the loudest sound source), and the secondary headset transmitting the audio signals or array transfer functions for the dominant sound source to a primary headset. However, the dominant sound source for the secondary headset may not be the target sound source for the primary headset. Thus, each secondary headset may transmit information for incorrect or different sound sources than the target sound source to the primary headset. Accordingly, embodiments proposed herein, provide a location of the target sound source to the secondary headsets, which mitigates chances of the secondary headsets latching on to a dominant sound source when the dominant sound source is not the target sound source.

As used herein, an "acoustic signal" refers to a physical pressure wave generated by a sound source, such as a person speaking, that may be detected by a human or transducer array.

As used herein, an "audio signal" refers to digital or analog data describing an acoustic signal. The audio signal may comprise a representation of the acoustic signal. In some embodiments, the audio signal may comprise array transfer functions for a sound signal. A device may detect an acoustic signal with a sensor array and convert the acoustic signal into an audio signal. Devices may process audio signals for various purposes, such as to enhance the quality of the audio signals. Devices may transmit audio signals wirelessly between each other.

As used herein, "audio content" refers to physical pressure waves generated by a device to present sound to a user. For example, a transducer array of the device may generate pressure waves directly via a speaker or via a bone or cartilage conduction transducer. The device may use the transducer array to convert digital or analog audio signals into audio content for a user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset

100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The audio controller 150 communicates with other devices to enhance audio signals for a target sound signal. The audio controller 150 is configured to transmit a location of a target sound source to other devices in the local area. The other devices perform a generalized eigenvalue decomposition to process an audio signal for the target sound source. The audio controller 150 is configured to receive the audio signals from the other devices and provide the audio signal to the transducer array to present audio content to the user. The functions of the audio controller 150 are described in more detail with respect to FIGS. 2-4.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. The images captured by the headset 100 may be used to determine the location of sound sources in the local area. Additional details regarding the components of the headset 100 are discussed below in connection with FIG. 5.

Figure 1B:
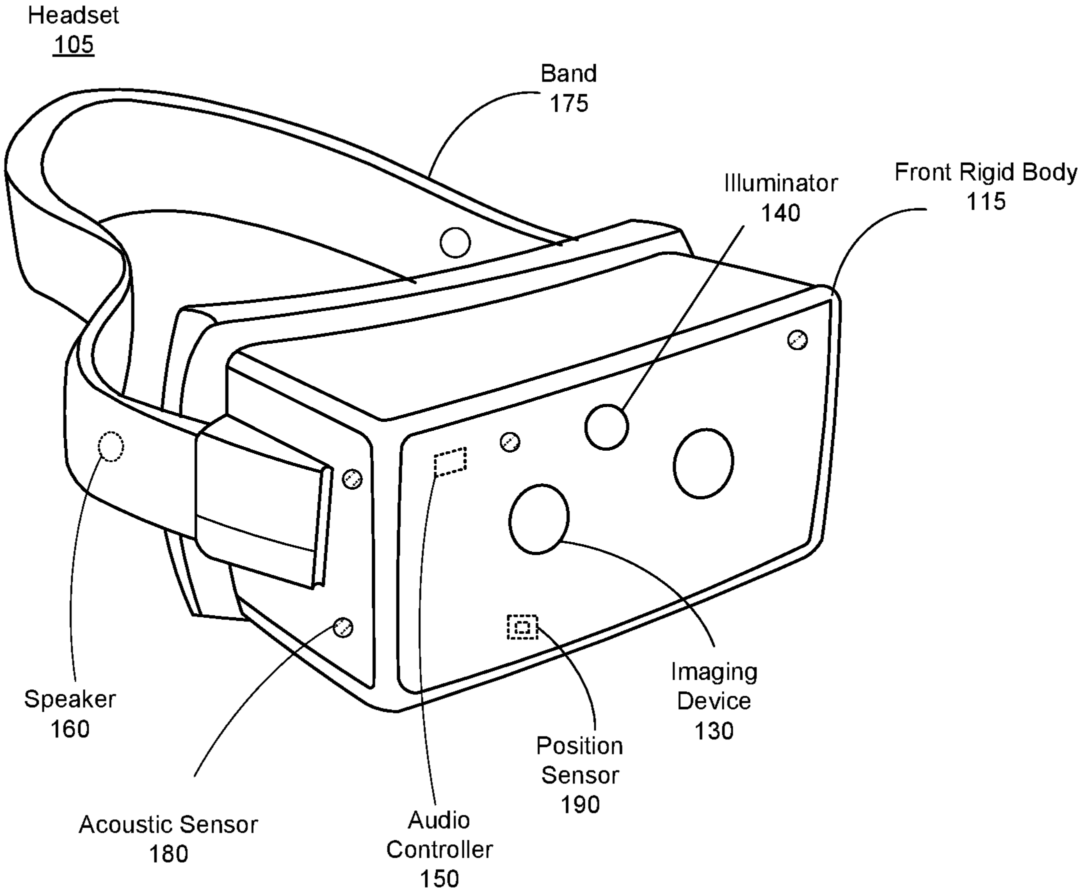
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system including an audio controller 150, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
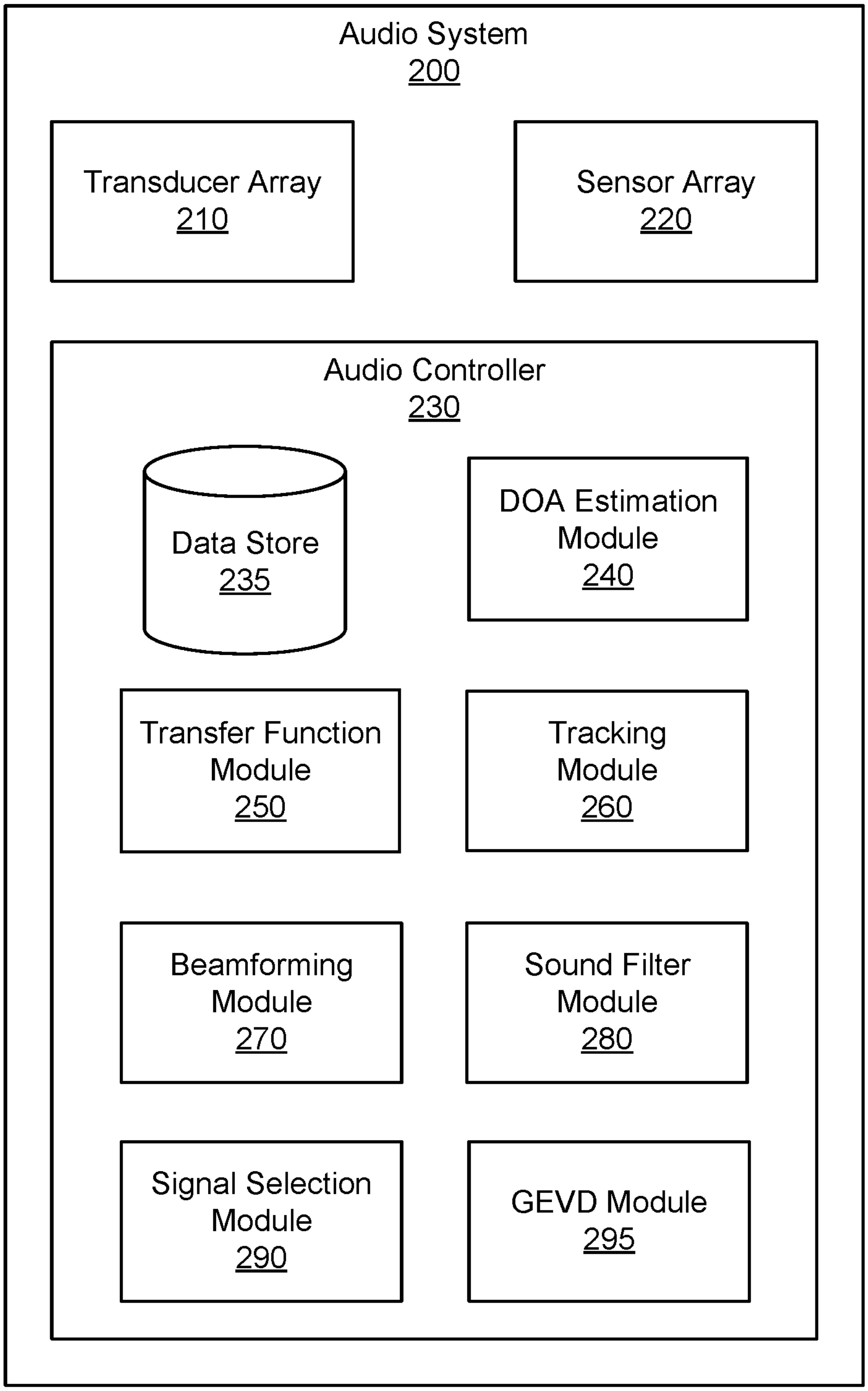
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 communicates with other devices in a local area to enhance audio content for a user. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, a sound filter module 280, and a signal selection module 290. The audio controller 230 may be located inside a headset in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The data store 235 stores a set of estimated ATFs for sound source locations at various directions relative to the headset. The set of estimated ATFs may comprise an ATF for directions equally spaced among all possible azimuth and altitude locations in a spherical coordinate system relative to the headset. In some embodiments, the data store 235 may store ATFs for directions at greater densities in different locations of the spherical coordinate system. For example, a greater number of sound sources may be expected to be observed in a plane horizontal to the ground level than in locations above and below the headset, thus the data store 235 may store a greater number of estimated ATFs for locations in the horizontal plane than at locations having highly positive or highly negative altitude angles.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. For example, the DOA estimation module 240 may estimate x-y-z coordinates of a sound source. The x-y-z coordinate system may be established relative to the headset, relative to the local area, or relative to a global coordinate system, such as a GPS coordinate system. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The external system may also map the locations of sound sources and devices within the local area. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears or to the acoustic sensors of the sensor array 220. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The beamforming module 270 may comprise a minimum variance distortionless response (MVDR) beamformer. The MVDR beamformer may comprise a data adaptive beamforming solution to minimize the variance of the beamformer output. If a noise source and a target sound source are uncorrelated, as is typically the case, then the variance of the captured signals may be the sum of the variances of the target signal and the noise. The MVDR solution seeks to minimize this sum, thereby mitigating the effect of the noise. The beamforming module 270 may calculate a signal-to-noise ratio (SNR) for a formed beam.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 5).

The sound filter module 280 provides the sound filters to the transducer array 210. In some embodiments, the sound filters may cause positive or negative amplification of sounds as a function of frequency.

The signal selection module 290 is configured to select an audio signal for a sound source to provide to the user. The signal selection module 290 may identify a target sound source. In some embodiments, the target sound source may be determined to be the sound source closest to the direction in which the user is facing. In some embodiments, the user may manually select a target sound source, such as by a verbal command, or the user pressing a button on the headset to select a target sound source.

The signal selection module 290 is configured to determine a location of the target sound source. The signal selection module 290 may retrieve the location of the target sound source from the DOA estimation module 240. The signal selection module 290 may identify the target sound source to the DOA estimation module 240 to retrieve the location of the target sound source. In some embodiments, the signal selection module 290 may retrieve the location of the target sound source from a model of the local area that includes the target sound source. The model may be populated by the DOA estimation module 240.

The signal selection module 290 may be configured to transmit the location of the target sound source to other devices in the local area. In some embodiments, the signal selection module 290 may transmit x-y-z coordinates of the target sound source to the other devices. In some embodiments, the signal selection module 290 may transmit a direction from the headset to the other devices in the local area. In some embodiments, the signal selection module 290 may be configured to provide the location of the target sound source to a transmitter within the same headset as the audio system 200, and the transmitter may transmit the location of the target sound source to other devices in the local area.

The signal selection module 290 is configured to receive an audio signal from each of the devices in the local area. The audio signal may be generated by the device by beamforming on a sound source in the direction of the location of the target sound source transmitted by the signal selection module 290. In some embodiments, the audio signal may comprise a digital or analog representation of the sound detected by the beamforming. In some embodiments, the audio signal may comprise an array transfer function for the target sound source. In some embodiments, the signal selection module 290 may be configured to receive an audio signal corresponding to a target sound source on a first channel and a signal corresponding to a noise sound source on a second channel. The signal selection module 290 may be configured to process the received audio signal to generate a beamformed audio signal.

The signal selection module 290 is configured to correlate the received audio signals with the audio signal for the target sound source generated by the beamforming module 270. In some embodiments, the signal selection module may determine that all audio signals are correlated, indicating that all audio signals are audio signals for the target sound source. The signal selection module 290 may select the audio signal with the highest SNR to process audio content presented to the user.

In some embodiments, the signal selection module 290 may determine that one or more audio signals do not correlate with the other audio signals, indicating that the audio signals are for different sound sources. In some embodiments, the signal selection module may use cross-correlation, generalized cross-correlation with phase transform (GCC-PHAT), coherence (e.g., magnitude squared coherence), a form of EVD or GEVD, or some combination thereof, do determine whether audio signals are correlated. The signal selection module 290 may execute a voting algorithm to determine which audio signals to exclude. In response to the signal selection module 290 receiving one audio signal that does not correlate with the audio signal generated by the beamforming module 270, the signal selection module 290 may exclude the received audio signal from the signal selection process. In response to the signal selection module 290 receiving multiple audio signals that do not correlate with the audio signal generated by the beamforming module 270, the signal selection module 290 may select a group of audio signals containing the greatest number of audio signals that correlate with each other, which may or may not include the audio signal generated by the beamforming module 270. The signal selection module 290 may select the audio signal with the highest SNR from the selected group of audio signals to process audio content presented to the user. In some embodiments, the signal selection module 290 may use a weighted combination of signals based on their respective SNRs to process audio content presented to the user.

The GEVD module 295 is configured to receive a location for a target sound source and provide an audio signal for the target sound source to a primary headset. The device containing the audio system 200 may function as a primary headset or a secondary headset at different times or for different sound sources. In situations, where the audio system 200 is functioning as part of a secondary headset, the GEVD module 295 may be configured to receive a location of a target sound source from the signal selection module 290. For example, a different device may be functioning as a primary headset, and the GEVD module 295 may receive the location of the target sound source form the other headset.

When the headset is operating as a secondary device, the GEVD module 295 is configured to perform a generalized eigenvalue decomposition to generate a list of array transfer functions for sound sources detected by the DOA estimation module 240. The GEVD module 295 retrieves a stored array transfer function from the data store 235 for the received location of the target sound source. The GEVD module 295 compares the array transfer functions for each sound source generated by the GEVD to the retrieved array transfer function for the direction of the received location. The GEVD module 295 selects the array transfer function from the list that most closely correlates to the array transfer function for the broadcast location. The GEVD module may perform cross-correlation or coherence to determine a peak correlation value and select the most closely correlated array transfer function. The selected array transfer function represents the sound source that is closest to the received location of the target sound source. The beamforming module 270 performs MVDR beamformer enhancement on the target sound source and transmits the output audio signal to the primary headset.

Figure 3:
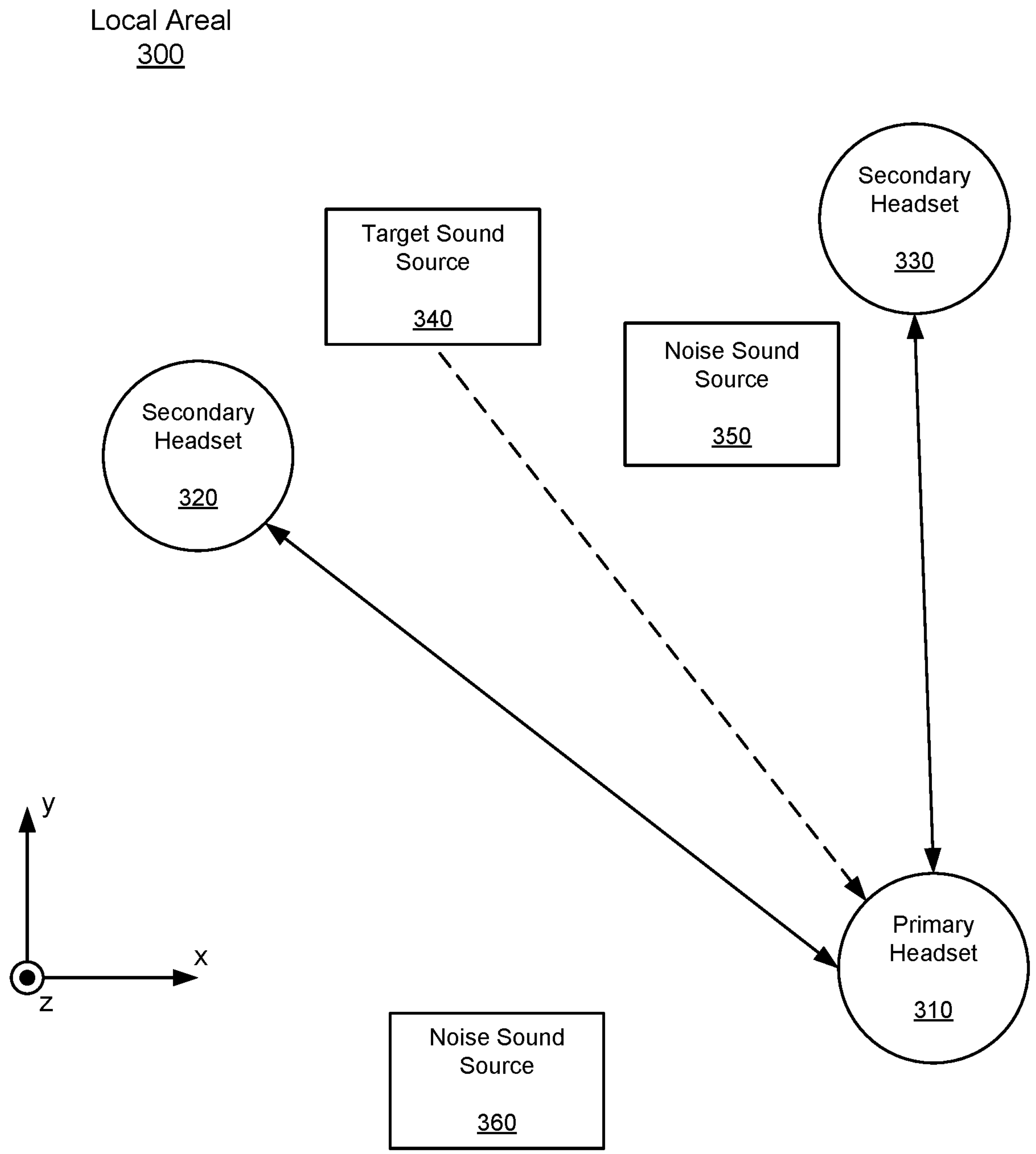
FIG. 3 is a schematic diagram of multiple sound sources, in accordance with one or more embodiments.

FIG. 3 is a schematic diagram of multiple headsets in a local area 300, in accordance with one or more embodiments. The local area 300 may be, for example, a restaurant in which multiple sound sources are present. The local area 300 as illustrated contains a primary headset 310, two secondary headsets 320, 330, a target sound source 340, and two noise sound sources 350, 360. The target sound source 340, may be for example, a person speaking that the user of the primary headset 310 would like to hear. In other embodiments, more or fewer headsets and sound sources may be present within the local area 300. Additionally, each headset may be co-located with a sound source, such as a user of a headset talking. An x-y-z coordinate system describes locations within the local area 300.

The primary headset 310 determines the location of the target sound source 340. For example, the primary headset may use a DOA module to estimate the location of the target sound source 340. In some embodiments, the first device may utilize a simultaneous location and mapping system to determine the location of the target sound source 340. The noise sound sources 350, 360 may be generating sound that interferes with the ability of the primary headset 310 to generate an audio signal for the target sound source 340 with a high SNR. The noise sound sources 350, 360 may comprise human speakers, non-human sound sources, or some combination thereof. The primary headset 310 transmits the location of the target sound source 340 to the secondary headsets 320, 330. The secondary headsets 320, 330 each perform a GEVD process to isolate the audio signal for the target sound source 340, as described with reference to FIG. 2. The secondary headsets 320, 330 each transmit an audio signal for the target sound source to the primary headset 310. In some embodiments, the audio signal may comprise a beamformed audio signal generated by each secondary headset 320, 330. In some embodiments, the audio signal may comprise a raw audio signal received by the secondary headsets, and the secondary headsets may transmit the raw audio signal and array transfer functions for the target sound source to the primary headset 310 for processing. In some embodiments, the secondary headsets 320, 330 may communicate with each other, such as by communicating the relative positions of the target sound source 340 and the secondary headsets 320, 330 to decrease processing requirements for the primary headset 310. For the secondary headset 320, the target sound source 340 is the closest sound source to the secondary headset 320, thus the target sound source 340 may be the dominant sound source for the secondary headset 320. However, for the secondary headset 330, the noise sound source 350 is closer than the target sound source 340 to the secondary headset 330. Thus, the noise sound source 350 may be the dominant sound source for the secondary headset 330. By receiving the location of the target sound source 340 from the primary headset 310, this helps mitigate chances that the secondary headset 330 may transmit the audio signal for the noise sound source 350 (instead of the target sound source 340) to the primary headset 310. However, in some embodiments, the secondary headset 320 may intentionally transmit an audio signal for the noise sound source 350 to the primary headset 310. The secondary headset 320 may indicate that the transmitted audio signal corresponds to the noise sound source 350. The primary headset 310 may utilize the received audio signal for the noise sound source 350 to assist with increasing the SNR for audio content presented to the user of the primary headset 310.

The primary headset 310 correlates the audio signals received from the secondary headsets 320, 330 with an audio signal for the target sound source 340 and generates audio content for the user of the primary headset 310, as described with reference to FIG. 2. For example, the primary headset may select an audio signal that corresponds to the target sound source and has the highest SNR and convert the audio signal to audio content for the user. Because the secondary headsets 320, 330 are each closer to the target sound source 340 than is the primary headset 310, the secondary headsets 320, 330 may be capable of generating audio signals for the target sound source 340 having higher SNR than an audio signal generated by the primary headset 310. The primary headset 310 may determine that audio signals having low SNRs correspond to noise sound source, and the primary headset 310 may utilize these audio signals to assist with decreasing noise signals presented to the user of the primary headset 310.

In some embodiments, the target sound source 340 may be a person wearing a headset. In such cases, the headset for the target sound source 340 may be capable of generating an audio signal with very high SNR due to the proximity of the headset to the wearer's mouth. Thus, the headset for the target sound source 340 may transmit the audio signal for the target sound source 340 to the primary headset 310, and the primary headset 310 may use the received audio signal to generate audio content for the user of the primary headset 310. However, in some embodiments, the SNR ratio for the audio signal generated by the headset for the target sound source 340 may be low (e.g., in the event that the transducer assembly of the headset is malfunctioning). Thus, the primary headset 310 may select an audio signal from one of the secondary headsets 320, 330 that have a higher SNR.

Figure 4:
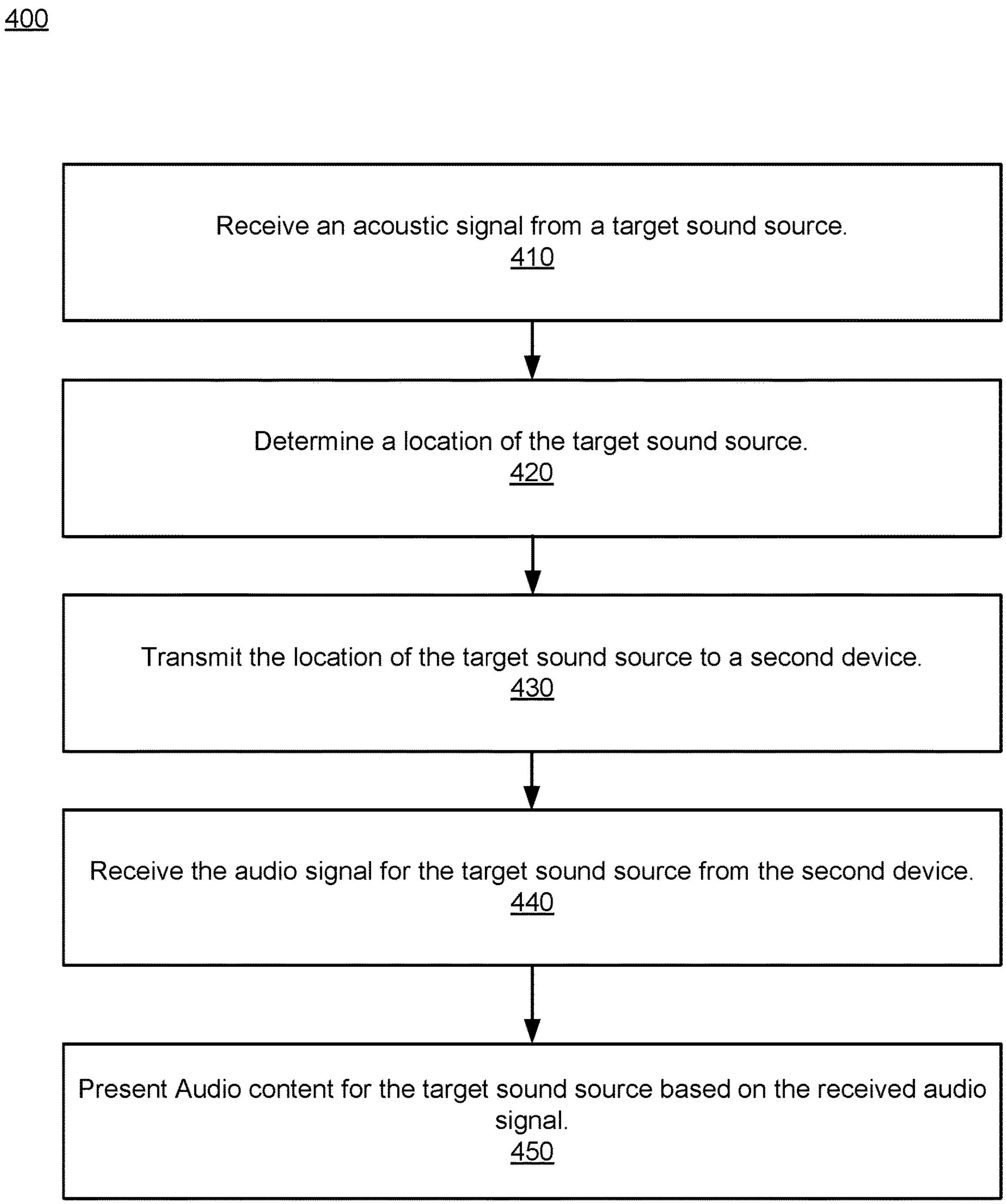
FIG. 4 is a flowchart illustrating a process for distributed enhancement of an audio signal, in accordance with one or more embodiments.

FIG. 4 is a flowchart of a method 400 for distributed enhancement of an audio signal, in accordance with one or more embodiments. The process shown in FIG. 4 may be performed by components of an audio system (e.g., audio system 200). Other entities may perform some or all of the steps in FIG. 4 in other embodiments. Embodiments may include different and/or additional steps, or perform the steps in different orders.

A first device receives 410 an acoustic signal from a target sound source. As used with reference to FIG. 4, the "first device" corresponds to a primary headset as described with reference to FIGS. 1-3. The first device may be an embodiments of the headset 100 of FIG. 1A and FIG. 1B. The target sound source may be a speaking human. The user of the first device may select the target sound source, the first device may automatically identify the target sound source, or some combination thereof.

The first device determines 420 a location of the target sound source. The first device may use a DOA module to estimate the location of the target sound source. In some embodiments, the first device may utilize a simultaneous location and mapping system to determine the location of the target sound source. In some embodiments, the location may comprise an absolute location, orientation, and/or rotation, which may be represented, for example, in an x-y-z coordinate space. In some embodiments, the location may comprise an angular direction from the first device.

The first device transmits 430 the location of the target sound source to a second device. As used with reference to FIG. 4, the "second device" corresponds to a secondary headset as described with reference to FIGS. 1-3. The first device may transmit the location to multiple second devices (inclusive of the second device) in the local area. The location may comprise the x-y-z coordinates of the target sound source, a position of the target sound source relative to the second device, or some combination thereof.

The second devices may each select an array transfer function for the target sound source based on the location of the target sound source received from the first device. The second devices each retrieve an estimated array transfer function for the received location from a stored set of array transfer functions. The stored set of array transfer functions may comprise array transfer functions for any direction relative to the second device. The stored set of array transfer functions may be independent from the local environment.

The second devices may each perform a generalized eigenvalue decomposition for sound sources detected by the second devices. The generalized eigenvalue decomposition may output a list of array transfer functions, each array transfer function corresponding to one of the sound sources.

The second device may correlate the estimated or known array transfer function with the list of array transfer functions and select the array transfer function from the list of array transfer functions which is most highly correlated with the retrieved estimated or known array transfer function.

The second device generates an audio signal for the target sound source based on the selected array transfer function.

In some embodiments, the second device forms a beam directed at the target sound source using the selected array transfer function to generate the audio signal. In some embodiments, the audio signal may comprise a raw audio signal generated by the sensor array of the second device and the selected array transfer function, such that the first device may perform the computation of applying the array transfer function to the raw audio signal. In some embodiments, the second device may transmit the raw audio signal from the microphone with the highest SNR for the target sound source (e.g., the microphone on the second device that is closest to the target sound source as determined by the provided position information for the target sound source) to the first device. The second device transmits the target audio signal to the first device.

The first device receives 440 the audio signal for the target sound source from the second device. The first device may receive an audio signal for the target sound source from each device in the local area. The first device correlates the audio signals with an audio signal (e.g., a beamformed audio signal directed at the target sound source) generated by the first device for the target sound source to determine whether the received audio signals correspond to the target sound source. In some embodiments, the first device and other devices in the local area may perform a voting process to determine whether the received audio signals correspond to the target sound source. For example, if three out of four received signals are highly correlated and the fourth signal is not highly correlated, the first device may determine that the fourth signal does not correlate to the target sound source. The first device may select the audio signal with the highest SNR corresponding to the target sound source.

The first device presents 450 audio content for the target sound source based on the received audio signal. The first device may output the audio content to a user via the speaker array on the first device. The presented audio content may have a higher SNR than audio content which was generated independently by the first device without communicating with the second device.

Figure 5:
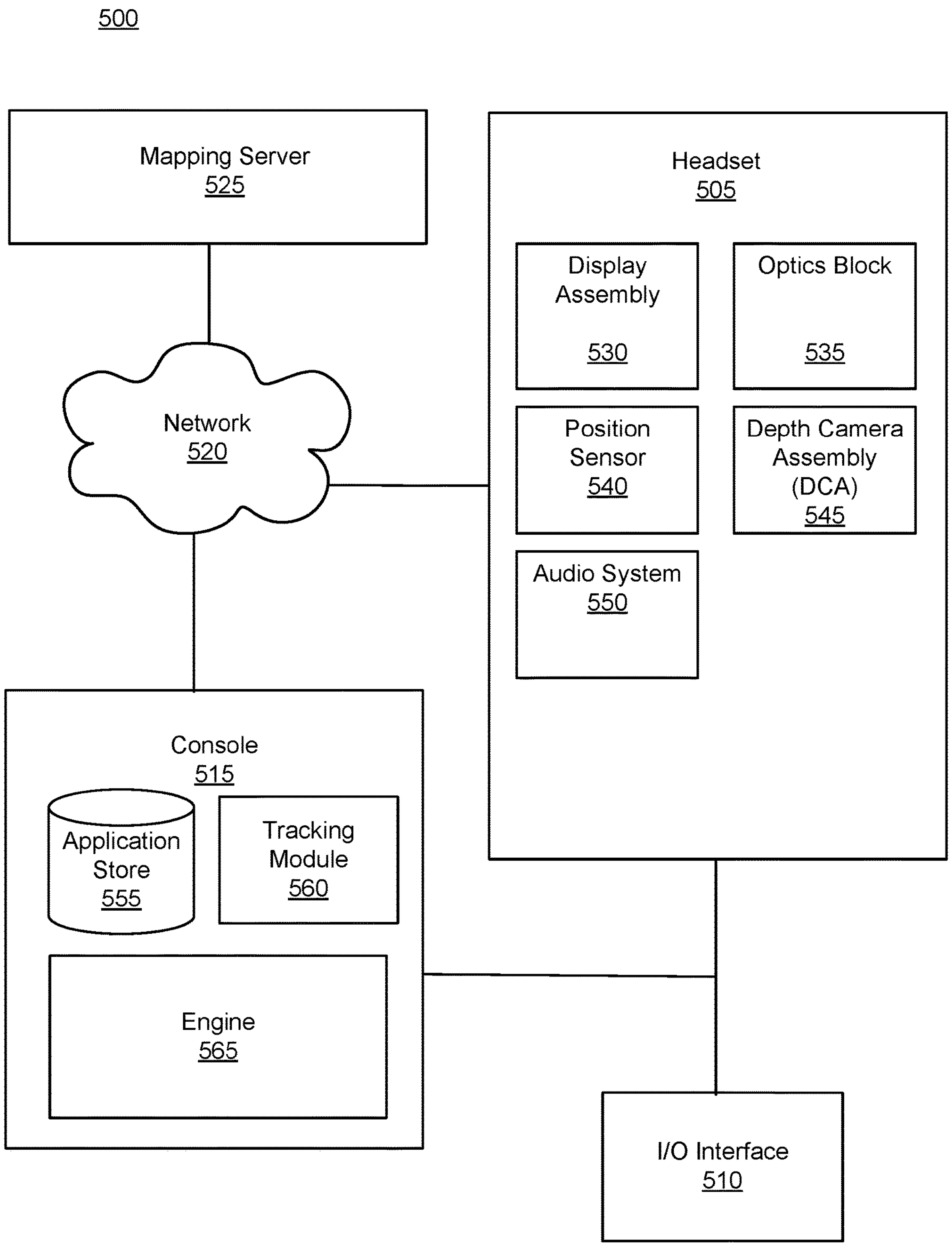
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUS, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 may be an embodiment of the audio system 200 describe above. The audio system 550 may comprise one or acoustic sensors, one or more transducers, and an audio controller. The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525, and use the sound filters to provide audio content to the user.

The audio system 550 may communicate with other devices in a local area to provide enhanced audio content for a target sound source. The audio system 550 may transmit a location of the target sound source to other devices in the local area. The audio system 550 may receive audio signals from the other devices for the target sound source. The audio system 550 may execute a selection algorithm to select an audio signal having the highest SNR and generate audio content based on the selected audio signal.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

The mapping server 525 may provide a coordinate system to the audio system 550. The audio system 550 may use the coordinate system to determine coordinates for the headset 505 as well as sound sources and other devices in the local area. The audio system 550 may transmit the coordinates of a target sound source to other devices in the local area.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The privacy settings may allow a user to indicate whether the system 500 may permit sharing of audio signals between headsets. For example, a user may not wish to receive and/or transmit audio signals using the headset 505, and the privacy settings may prevent other headsets from obtaining such information from the headset 505.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving, at a first device, an acoustic signal from a target sound source physically located in a same environment as the first device;

determining a location of the target sound source based on the acoustic signal;

transmitting the location of the target sound source to a second device, wherein:

the second device selects a first array transfer function for the target sound source from a list of array transfer functions generated based on sound sources detected by the second device, the sound sources detected by the second device comprise the target sound source and one or more noise sources, the first array transfer function is selected based on being more closely associated with the location of the target sound source than other array transfer functions in the list of array transfer functions, and the second device generates a first audio signal for the target sound source using the first array transfer function;

receiving, from the second device, the first audio signal for the target sound source; and presenting, by the first device and based on the first audio signal, audio content for the target sound source.

2. The method of claim 1, further comprising receiving, by the first device, the first array transfer function from the second device.

3. The method of claim 1, further comprising generating, by the first device, a second audio signal for the target sound source.

4. The method of claim 3, further comprising selecting, by the first device, the first audio signal or the second audio signal based on a signal to noise ratio (SNR) of the first audio signal and a SNR of the second audio signal.

5. The method of claim 3, further comprising determining, based on comparing the first audio signal and the second audio signal, whether the first audio signal corresponds to the target sound source.

6. The method of claim 3, further comprising:

receiving, by the first device, a third audio signal from a third device; and correlating, by the first device, the first audio signal, the second audio signal, and the third audio signal.

7. The method of claim 1, wherein the second device generates the list of array transfer functions based on a generalized eigenvalue decomposition.

8. A non-transitory computer-readable storage medium having instructions encoded thereon that, when executed by a processor, cause the processor to perform operations comprising:

receiving, by a processor of a first device, an acoustic signal from a target sound source physically located in a same environment as the first device;

determining, by the processor, a location of the target sound source;

transmitting, by the processor, the location of the target sound source to a second device, wherein:

the second device selects a first array transfer function for the target sound source from a list of array transfer functions generated based on sound sources detected by the second device, the sound sources detected by the second device comprise the target sound source and one or more noise sources, the first array transfer function is selected based on being more closely associated with the location of the target sound source than other array transfer functions in the list of array transfer functions, and the second device generates a first audio signal for the target sound source using the first array transfer function;

receiving, by the processor and from the second device, the first audio signal for the target sound source; and presenting, by the processor and based on the first audio signal, audio content for the target sound source.

9. The non-transitory computer-readable storage medium of claim 8, wherein the instructions further cause the processor to receive the first array transfer function from the second device.

10. The non-transitory computer-readable storage medium of claim 8, wherein the instructions further cause the processor to perform operations comprising generating, by the processor, a second audio signal for the target sound source.

11. The non-transitory computer-readable storage medium of claim 10, wherein the instructions further cause the processor to perform operations comprising selecting, by the processor, the first audio signal or the second audio signal based on a signal to noise ratio (SNR) of the first audio signal and a SNR of the second audio signal.

12. The non-transitory computer-readable storage medium of claim 10, wherein the instructions further cause the processor to perform operations comprising determining, by the processor and based on comparing the first audio signal and the second audio signal, whether the first audio signal corresponds to the target sound source.

13. The non-transitory computer-readable storage medium of claim 10, wherein the instructions further cause the processor to perform operations comprising:

receiving, by the processor, a third audio signal from a third device; and correlating, by the processor, the first audio signal, the second audio signal, and the third audio signal.

14. The non-transitory computer-readable storage medium of claim 8, wherein the second device generates the list of array transfer functions based on a generalized eigenvalue decomposition.

15. A method comprising:

receiving, at a first device, a location of a target sound source from a second device, wherein the target sound source is physically located in a same environment as the first device and the second device;

retrieving, from a stored set of array transfer functions, an estimated array transfer function for the location of the target sound source, wherein the array transfer functions in the stored set of array transfer functions are associated with different locations;

performing, by the first device, a generalized eigenvalue decomposition to generate a list of array transfer functions for sound sources detected by the first device, wherein the sound sources detected by the first device comprise the target sound source and one or more noise sources;

selecting a first array transfer function for the target sound source from the list of array transfer functions, wherein selecting the first array transfer function comprises comparing the list of array transfer functions to the estimated array transfer function to determine that the first array transfer function is more closely associated with the location of the target sound source than other array transfer functions in the list of array transfer functions;

generating, using the first array transfer function, an audio signal for the target sound source; and transmitting, by the first device, the audio signal to the second device.

16. The method of claim 15, further comprising transmitting the first array transfer function to the second device.

17. The method of claim 15, wherein comparing the list of array transfer functions to the estimated array transfer function comprises determining, for each array transfer function in the list of array transfer functions, a corresponding degree of correlation between the array transfer function and the estimated array transfer function, and wherein the first array transfer function is selected based on having the highest correlation among the list of array transfer functions.

18. The method of claim 15, further comprising forming a beam at the target sound source using the first array transfer function.

19. The method of claim 15, wherein the second device generates audio content based on the audio signal.

20. The method of claim 15, wherein the target sound source is not a dominant sound source for the first device, the dominant sound source for the first device being one of the one or more noise sources, and wherein the dominant sound source for the first device is different than a dominant sound source for the second device.

* * * * *